tilting correction in the cross section perpendicular to the deflection plane.

FIG. 6A shows the lens configuration of the Table 1 embodiment in the plane parallel to the deflection plane, and FIG. 6B shows the lens configuration of said embodiment in the cross section perpendicular to the deflection plane. FIG. 7A shows the aberrations in said embodiment in the plane parallel to the deflection plane, and FIG. 7B shows the aberrations in said embodiment in the cross section perpendicular to the deflection plane. In FIG. 7A, LIN is a quantity representing linearity, which is expressed as $$\text{linearity} = \frac{y' - f_p \cdot \theta}{f_p \cdot \theta} \times 100 \quad (y': \text{image height})$$

In the aberration graphs of FIGS. 7A and 7B, as shown in the column Sk' of those of the tables which are given a suffix (b), the distance from the last surface (the $r_4$ surface or the $r_4'$ surface) of the single lens 5 having the toric surface to the Gauss image plane differs in the respective planes.

The embodiments of the present invention shown in Tables 1–8 satisfy, for example, the design specification shown by the following parameters. That is, if the beam is imaged in a condition in which the cross-sectional intensity distribution of the beam is a Gauss distribution and there is no truncation and the wavelength used is set to 800 nm and the effective F No. in the cross section parallel to the deflection plane is set to 60, then the allowable value $\Delta x$ of the depth of focus is $\Delta x = 3.7$ mm.

Accordingly, if the focal length $f_p$ of the composite system comprising the spherical single lens 4 and the single lens 5 having the toric surface in the cross section parallel to the deflection plane is set to $f_p = 100$ mm, it will be seen from formula (3) that $|2\,\text{III}+\text{IV}| \leq 0.56$ may be established in order that the meridional curvature of image field $\Delta M$ may satisfy $|\Delta M| \leq 3.7$ mm.

In view of the embodiments of the present invention shown in Tables 1–8, if the relation between the radius of curvature $r_3$ of the deflector side surface of the single lens 5 having the toric surface and the radius of curvature $r_4$ of that surface of the single lens which is adjacent to the medium to be scanned is $(1/r_3) < (1/r_4)$ in the plane parallel to the deflection plane, and if the relation between the focal length $f_p$ of the composite system comprising the spherical single lens 4 and the single lens 5 having the toric surface in the plane parallel to the deflection plane and the focal length $f_v$ of said composite system in the cross section perpendicular to the deflection plane is $4.0 < (f_p/f_v) < 5.4$, then the scanning optical system of the present invention has such a strain characteristic that uniform speed scanning is effected on the medium 6 to be scanned, in the plane parallel to the deflection plane, and has a tilting correcting effect in the cross section perpendicular to the deflection plane.

In the foregoing description, it is to be understood tha the sign of a radius of curvature is positive when that surface is convex toward the deflector side and is negative in the reverse case.

FIG. 8 shows an embodiment of the scanning optical system according to the present invention as applied to a laser beam printer. In FIG. 8, the laser beam oscillated from a laser oscillator 11 is directed via reflecting mirrors 12 to the entrance opening of a modulator 13. In the modulator 13, the laser beam is modulated by an information signal to be recorded, whereafter it is caused to form a linear image orthogonal to the rotary shaft 15a of a deflector 15 near the deflecting and reflecting surface of the deflector by a linear image forming system 14 comprising, for example, a cylindrical lens. The beam deflected by the deflector 15 is imaged on a photosensitive drum 17 by an imaging lens system 16 comprising the above-described spherical single lens 16a and toric single lens 16b, and scans the photosensitive drum 17 at a uniform speed. Reference numeral 18 designates a first corona charger and reference numeral 19 denotes an AC corona discharger. Both of them form a part of the apparatus for performing the electrophotographic process.

The laser oscillator 11 may be a light source device comprising a self-modulatable semiconductor laser and a beam reforming optical system for correcting the shape of the beam cross section of the laser light from the semiconductor laser and making the laser beam into an afocal light.

In the above-described application, the light beam entering the spherical single lens 16a in the plane parallel to the deflection plane need not always be a parallel beam but may be either divergent beam or a convergent beam, and the purpose of causing the light beam to be imaged near the reflecting surface of the deflector 15 in the cross section perpendicular to the deflection plane can be easily achieved by the light source device 11 comprising a light source and a condensing device and the linear image forming device 14.

Also, in the above-described application, where a light source such as a semiconductor laser in which the angle of light emission differs in two orthogonal planes is used as the light source device 11, if a rotationally symmetric optical system is used as the linear image forming system 14 by the utilization of the fact that the light-emitting point differs in said two orthogonal planes (since this is equivalent to the fact that the object point has an astigmatic difference in said two orthogonal planes), it will also be possible to cause the light beam to be imaged near the reflecting surface of the deflector 15 in the cross section perpendicular to the deflection plane and to cause a divergent light or a convergent light to enter the spherical single lens 16a in the plane parallel to the deflection plane.

What we claim is:

1. A scanning optical system for scanning a medium and having a tilting correcting function, comprising:
   means for supplying a light beam;
   means having a deflecting and reflecting surface for deflecting the light beam from said light beam supplying means in a predetermined direction;
   first optical means disposed between said light beam supplying means and said deflecting means for linearly forming the light beam from said light beam supplying means near said deflecting and reflecting surface of said deflecting means; and
   second optical means disposed between said deflecting means and a medium to be scanned for imaging on said medium the light beam deflected by said deflecting means, said second optical means comprising, in succession from said deflector, a single spherical lens and a single lens having a toric surface, the product of the curvature of the surface of said single spherical lens which is adjacent to said deflecting means and the curvature of the surface of said single spherical lens on the side of said medium being zero or less.

United States Patent [19]

Ueda et al.

[11] 4,447,113

[45] May 8, 1984

[54] SETUP CONDITION RECORDER FOR A COLOR SCANNER

[75] Inventors: Sadao Ueda, Yasu; Isao Tokura, Uji; Mitsuhiko Yamada, Kyoto, all of Japan

[73] Assignee: Dainippon Screen Seizo Kabushiki Kaisha, Japan

[21] Appl. No.: 152,472

[22] Filed: May 22, 1980

[30] Foreign Application Priority Data

May 29, 1979 [JP] Japan .................................. 54-65626

[51] Int. Cl.³ .............................................. H04N 1/46
[52] U.S. Cl. ........................................ 358/75; 358/80
[58] Field of Search .................................. 358/75–80, 358/280, 282

[56] References Cited

U.S. PATENT DOCUMENTS

| | | | |
|---|---|---|---|
| 3,904,816 | 9/1975 | Taudt et al. | 358/80 |
| 4,092,668 | 5/1978 | Knop | 358/80 |
| 4,096,519 | 6/1978 | Hoffrichter et al. | 358/80 |
| 4,163,605 | 8/1979 | Yamada | 358/80 |
| 4,204,223 | 5/1980 | Gast et al. | 358/80 |
| 4,270,141 | 5/1981 | Sakamoto | 358/78 |
| 4,305,094 | 12/1981 | Yamada | 358/80 |

*Primary Examiner*—John C. Martin
*Attorney, Agent, or Firm*—Marvin H. Kleinberg

[57] ABSTRACT

A setup condition recorder for a color scanner for reproducing a reproduction picture, wherein an original picture to be reproduced, secured to a picture mount means, is scanned by a pickup head to obtain a picture signal, and wherein an operational unit determines setup conditions for the color scanner from the picture signal, and the setup conditions are recorded on a recording medium by a recording unit.

6 Claims, 1 Drawing Figure

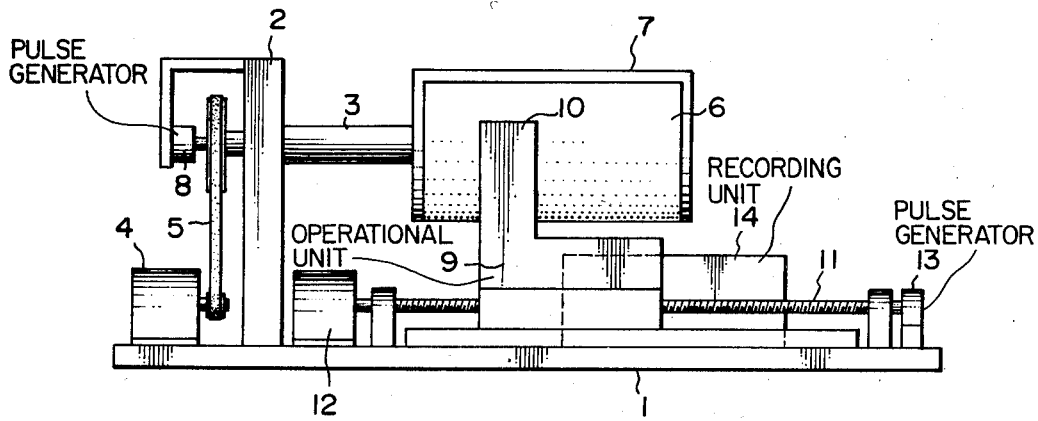

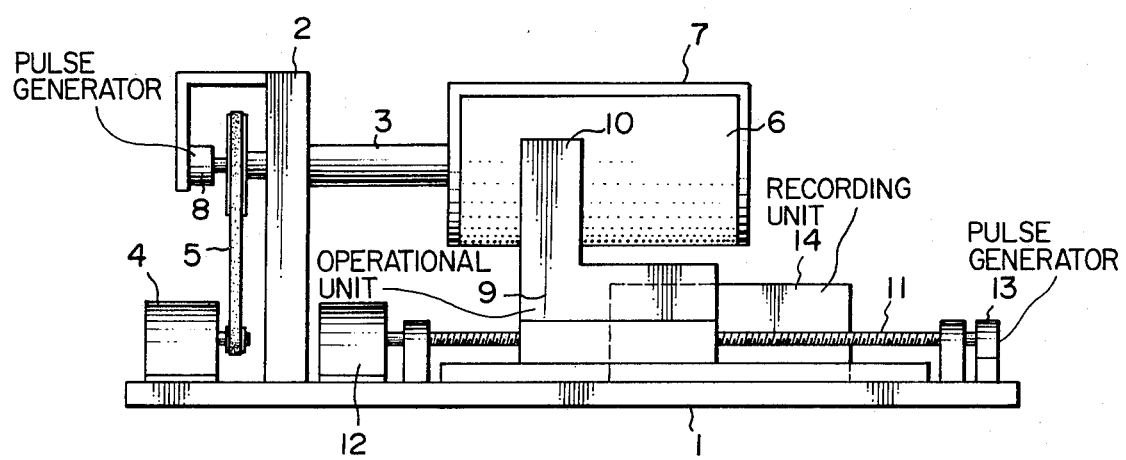

SETUP CONDITION RECORDER FOR A COLOR SCANNER

BACKGROUND OF THE INVENTION

This invention relates to a setup condition recorder for a color scanner.

When color separation printing films or plates are produced, an operator sets up conditions such as density range, gradation, color correction, under color removal, sharpness emphasis, and so forth, for a color scanner depending on an original picture and specifications attached thereto for specific portions such as a highlight point, a shadow point, a point whose color is to be corrected, of the original picture so that a picture reproduction may satisfy the demands.

In order to carry this out, various methods have been attempted. For example, in the first method, the brightness and the color of the specific portions are adjusted while the output values of the optical system and the operational circuit in the color scanner are observed.

However, in this method, since the color scanner Posseses a high resolving power and the original picture involves minute unevenness in the specific portions, a little slippage off a check point results in a large change of the output value, and hence the output value does not represent the specific portion, or when the same portion is checked again, the same output value is not obtained, which is not reliable and not stable.

In the second method, the densities of the specific portions are measured by a densitometer, or the like, and a neutral-density filter, certain values of gray and color scales, and so forth, are selected depending on the densities measured. Then, according to these conditions selected or adjusting amounts calculated therefrom the basic setup of the color scanner is carried out.

In this embodiment, when the values in the gray scale range, i.e. between the highlight and the shadow points, of the picture is similar to those of other pictures, there is no problem. However, when it is not similar to the others, it is impossible to perform this method.

In the third method, the outline of an image in the original picture is drawn on a tracing paper, and the specific portions are marked therein. However, this method indicates a quite rough instruction.

SUMMARY OF THE INVENTION

It is an object of the present invention to provide a setup condition recorder for a color scanner free from the aforementioned defects, which is reliable and stable, and is simple in construction.

According to the present invention there is provided a setup condition recorder for a color scanner, comprising (a) a picture mount means on which an original picture to be reproduced is secured, (b) a pickup head which is adapted to be moved over the original picture to and from, and picks up a picture signal by scanning the original picture, (c) an operational unit which determines setup conditions, from the picture signal, for a color scanner for reproducing a reproduction picture, and (d) a recording unit which records the setup conditions on a recording medium.

BRIEF DESCRIPTION OF DRAWINGS

In order that the present invention may be better understood, a preferred embodiment will now be described with reference to the accompanying drawing, in which:

The FIGURE is an elevational view of a machine according to the present invention.

DESCRIPTION OF A PREFERRED EMBODIMENT

Referring now to the drawing, there is shown in the Figure a setup condition recorder for a color scanner according to the present invention.

In the left side of a base plate 1 is secured a pillar 2. A horizontal drive shaft 3 is rotatably mounted to the upper part of the pillar 2, and is driven by a drive motor 4 mounted to the left side end of the base plate 1 via an endless belt 5.

A picture cylinder 7 on which an original picture 6 to be reproduced is attached, is mounted to the right end portion of the drive shaft 3, and a pulse generator 8 such as a rotary encoder is fixed to the left end of the drive shaft 3. The pulse generator 8 outputs pulse signals, for instance, 4000 signals per one rotation of the shaft 3, corresponding to the rates of the rotation of the drive shaft.

An operational unit 9 having a pickup head 10, which picks up larger area such as a square having a side of 150–200 micron rather than that of the color scanner, in its upper part is moved in the direction of the axis of the picture cylinder 7 by a screw rod 11 and a drive motor 12 coupled thereto, which are mounted on the base plate 1, so that the pickup head 10 for scanning the original picture 6 may be moved over the original picture 6 mounted on the cylinder 7, The operational unit 9 operates the setup conditions for the color scanner (not shown) from a picture signal which is picked up by the pickup head 10 by scanning the original picture 6, as disclosed in the Japanese Patent application No. 53-155954 which taught a color control simulator for obtaining proper color control conditions for a picture reproducing machine, comprising a color separator which separates a color picture signal picked up at certain points of an original picture into color separation signals of primary colors such as red, green and blue; an operational processor which generally comprises a digital computer, and operates color control conditions for the picture reproducing machine according to the fundamental conditions of the original Picture; input means such as a keyboard, a tape reader, or the like, for a computer, which sends supplemental data to the operational processor; adjusting means such as digital switches, combinations of potentiometers and analog-digital converters, or the like, for adjusting the color control conditions, whch correspond to those of the picture reproducing machine; a timing pulse generator which controls the timing of the system and sends timing pulses to the color separator and the operational processor; and output display means which is provided in case of need, such as a card printer, a tape printer, a character writer, cassette tape, or the like, and displays or records the color conditions set up.

In the color separator, the color separation signals R, G and B are converted into color separation density signals in a conventional manner, and then the color separation density signals are fed into the operational processor in synchronization with timing pulses generated by the timing pulse generator, wherein the operation is started in synchronization with a timing pulse as hereinafter described.

The operational processor includes the same operational functions such as density correction, color cor-